United States Patent
Anazawa et al.

(10) Patent No.: US 6,688,154 B2
(45) Date of Patent: Feb. 10, 2004

(54) DIE FOR FORGING ROTOR, FORGE PRODUCTION SYSTEM AND FORGING METHOD USING THE DIE, AND ROTOR

(75) Inventors: Yoshiyuki Anazawa, Fukushima (JP); Hidemi Yamada, Fukushima (JP); Keiichi Yokoi, Fukushima (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/195,525

(22) Filed: Jul. 16, 2002

(65) Prior Publication Data

US 2003/0015016 A1 Jan. 23, 2003

Related U.S. Application Data

(60) Provisional application No. 60/307,356, filed on Jul. 25, 2001.

(30) Foreign Application Priority Data

Jul. 19, 2001 (JP) ..................... P2001-219271

(51) Int. Cl.[7] ................. B21J 13/02
(52) U.S. Cl. ............... 72/359; 72/352; 72/478
(58) Field of Search ............... 72/352, 354.2, 72/358, 359, 478; 29/893.34

(56) References Cited

U.S. PATENT DOCUMENTS 3,595,058 A * 7/1971 Beneke ................. 72/352

FOREIGN PATENT DOCUMENTS

| JP | H03-165948 A | 7/1991 |
|----|--------------|--------|
| JP | H06-015492 A | 1/1994 |
| JP | 2000-117381 A | 4/2000 |
| JP | 2000-220588 A | 8/2000 |

\* cited by examiner

Primary Examiner—Lowell Larson
(74) Attorney, Agent, or Firm—Sughrue Mion, PLLC

(57) ABSTRACT

A forging die for forging a cylindrical rotor having a plurality of vane-accommodating grooves which extend toward the axis of the rotor, includes an upper die; a lower die having a mold cavity in its center portion, and a plurality of vane-accommodating-groove-forming portions which protrude inward from an inner wall which defines the mold cavity; and a spacer having a plurality of shell segments for determining a shape of a side wall of the cylindrical rotor which is segmented by the vane-accommodating grooves, and a flange for joining the shell segments is disclosed. The spacer is provided in the interior of the mold cavity of the lower die. A forging production system for producing the rotor; a method for producing the rotor; and the rotor are also disclosed. The forging die produces a rotor of high dimensional accuracy at low cost, which die enables production of vane-accommodating grooves of high accuracy, and enables prevention or reduction of working required for removing chamfers of the vane-accommodating grooves.

9 Claims, 12 Drawing Sheets

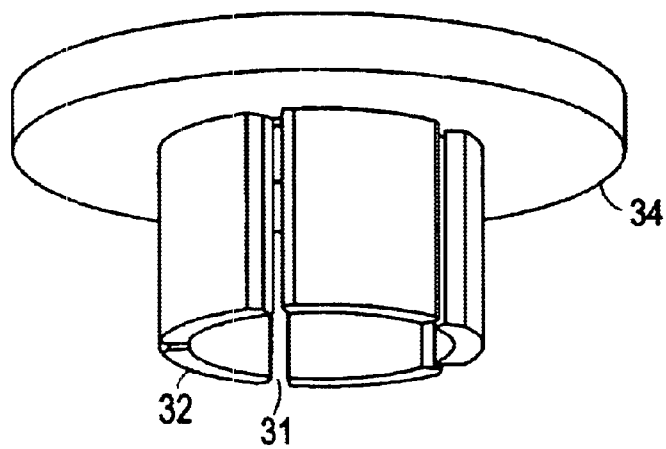
FIG. 6A
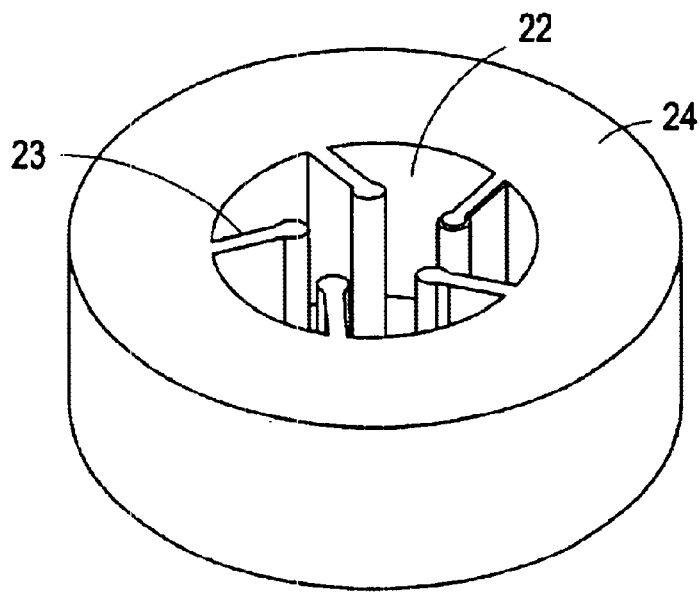
FIG. 6B
FIG. 7
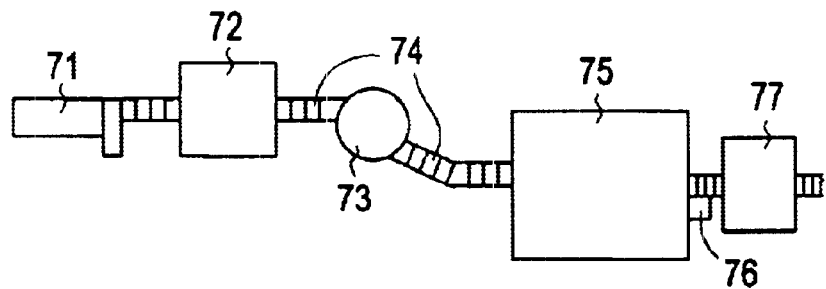

221

US 6,688,154 B2

DIE FOR FORGING ROTOR, FORGE PRODUCTION SYSTEM AND FORGING METHOD USING THE DIE, AND ROTOR

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/307,356 filed Jul. 25, 2001 pursuant to 35 U.S.C. §111(b).

FIELD OF THE INVENTION

The present invention relates to a die for forging a cylindrical rotor having thin, vane-accommodating grooves which extend inward from the periphery of the rotor, to a forging production system for producing the rotor, to a method for forging the rotor, and to the rotor.

BACKGROUND OF THE INVENTION

Rotors have been employed in rotary compressors and vane pumps. Conventionally, rotors have been formed through the following method: aluminum alloy powder, an aluminum alloy cast material, or an extrusion material thereof is subjected to extrusion by use of an extrusion die as shown in FIG. 15 having portions that form vane-accommodating grooves (hereinafter referred to as "vane-accommodating-groove-forming portions" or simply "groove-forming portions") (151), and the thus-extruded preform is subjected to cutting; or a method as disclosed in Japanese Patent Application Laid-Open (kokai) No. 3-165948 in which an aluminum alloy material is subjected to forging by use of a die shown in FIG. 16, to thereby form a side wall of a cylindrical rotor and vane-accommodating grooves. When vane-accommodating grooves are formed through forging, in many cases, as shown in FIG. 17, a cylindrical portion (171) is provided at a position of a vane-accommodating-groove-forming portion which corresponds to the bottom of a vane-accommodating groove, in order to reduce stress concentration factor, form a relief of a working tool to thereby improve workability, and apply back pressure to a vane to thereby improve sealing performance.

When the aforementioned method in which an extruded preform is subjected to cutting is employed, since a material for a rotor to be extruded is easily twisted to thereby generate bending and warpage, possibly leading to failure to obtain dimensional accuracy in terms of straightness of a vane-accommodating groove which extends toward the axis of a rotor, excess working is required in order to obtain such dimensional accuracy, resulting in an increase in production costs. In addition, due to poor lubrication between the extrusion die and an aluminum alloy material, sticking and galling occur on the surface of the extrusion die, resulting in poor surface precision. Therefore, since excess working is required in order to attain high surface precision, production costs increase. When the extrusion die is employed, due to stress applied to the die, cracking is generated from sticking or galling occurring on the bottom of the groove-forming portions, thereby lowering durability of the die. In addition, since the shape of a chamfer (152), which is shown in greater detail in FIG. 1(B) and which is provided on the base of the groove-forming portion in order to prevent bending or breakage of the groove-forming portion, is reflected on the extruded rotor, machining for removing the resultant chamfer of the rotor is required in the subsequent step.

Meanwhile, when the aforementioned forging method is employed, the shape of a chamfer (172), which is provided on the base of a groove-forming portion of a forging die in order to prevent bending or breakage of the groove forming portion as in the case of the aforementioned extrusion die, is reflected on a forged product, and thus machining for removing the resultant chamfer of the forged product is required. Therefore, the resultant forged product (i.e., rotor) must be subjected to machining, resulting in high production costs. Since excess material (181) as shown in FIG. 18, which is required for working of the resultant chamfer, is removed, yield on the basis of the raw material is lowered, and production costs increase.

When a conventional forging die shown in FIG. 19 having no chamfer at a base (191) of a groove-forming portion is employed, during molding of a material, stress is applied to the base of the groove-forming portion, the groove-forming portion is bent, and dimensional accuracy in terms of straightness of a vane-accommodating groove is impaired. As a result, machining for obtaining such dimensional accuracy is required, and production costs increase. In addition, since the base of the groove-forming portion may be broken during forging in accordance with the degree of stress applied thereto, costs required for the die increase; i.e., production costs increase.

In order to solve dimensional-accuracy-related problems encountered by the aforementioned forging method, Japanese Patent No. 3127587 discloses a forging die including a die portion for forming a side wall of a cylindrical rotor and vane-accommodating-groove-forming portions, the groove-forming portions being formed separately from the die portion, and being shrunk on the die portion. However, since each of the groove-forming portions is supported merely by its base, considerable deviation of the groove-forming portion occurs during molding, thereby lowering dimensional accuracy of a vane-accommodating groove of the resultant forged product.

Meanwhile, in order to solve the mentioned accuracy-related problems, Japanese Patent Application Laid-Open (kokai) No. 2000-220588 discloses a mechanism in which vane-accommodating-groove-forming portions are provided on a punch, and deviation of the groove-forming portions is prevented by means of grooves for mating the groove-forming portions, the mating grooves being provided on a die. However, since a material intrudes into the mating grooves under application of pressure, and flash-shaped excess material which is formed through punching remains in vane-accommodating grooves of the resultant rotor, high production costs are required for removing the excess material.

SUMMARY OF THE INVENTION

In view of the foregoing, the present invention has been accomplished for solving the following problems: problems involved in an extrusion method; i.e., high production costs attributed to excess working required for producing vane-accommodating grooves of high accuracy; and problems involved in a forging method; i.e., high production costs attributed to excess working for removing excess material corresponding to the chamfer of vane-accommodating grooves, low dimensional accuracy of the vane-accommodating grooves, and generation of flash-shaped, excess material on the side wall of a rotor.

The present invention provides a forging die for producing a rotor of high dimensional accuracy at low cost, which die enables production of vane-accommodating grooves of high accuracy, and enables prevention or reduction of working required for removing chamfers of the vane-accommodating grooves. The present invention also provides a forging production system for producing the rotor; a method for producing the rotor; and the rotor.

The present inventors have performed extensive studies on the relation between a forging die and working accuracy of vane-accommodating grooves of a forged rotor product, thus leading to completion of the invention on the basis of their findings.

1) A first embodiment of the present invention for solving the aforementioned problems provides a forging die for forging a cylindrical rotor having a plurality of vane-accommodating grooves which extend toward an axis of the rotor, comprising an upper die; a lower die having a mold cavity in a center portion, and a plurality of vane-accommodating-groove-forming portions which protrude inward from an inner wall which defines the mold cavity; and a spacer having a plurality of shell segments for defining a shape of a side wall of the cylindrical rotor which is segmented by the vane-accommodating grooves, and a flange for joining the shell segments, the spacer being provided in the interior of the mold cavity of the lower die.

2) A second embodiment of the present invention for solving the aforementioned problems provides a forging die according to 1), wherein each of the shell segments of the spacer has an axial length equal to or greater than the axial length of the rotor and twice or less than twice the axial length of the rotor.

3) A third embodiment of the present invention for solving the aforementioned problems provides a forging die according to 1) or 2), wherein each of the shell segments of the spacer has a thickness $1/10$ to $1/2$ the length of each of the vane-accommodating-groove-forming portions, the thickness being measured from the inner wall which defines the mold cavity toward the center of the spacer.

4) A fourth embodiment of the present invention for solving the aforementioned problems provides a forging die according to any one of 1) through 3), wherein a chamfer is provided between a base of each of the vane-accommodating-groove-forming portions and the inner wall which defines the mold cavity, and each of the shell segments of the spacer has a thickness 1 to 20 times the maximum curvature radius of the chamfer, the thickness being measured from the inner wall which defines the mold cavity toward the center of the spacer.

5) A fifth embodiment of the present invention for solving the aforementioned problems provides a forging die according to any one of 1) through 4), wherein a cylindrical protrusion having a maximum radius less than the distance between the center of the mold cavity and each of the vane-accommodating-groove-forming portions is provided on the center of the bottom surface of the lower die.

6) A sixth embodiment of the present invention for solving the aforementioned problems provides a forging die according to any one of 1) through 4), wherein a cylindrical protrusion having a maximum radius less than the distance between the center of the mold cavity of the lower die and each of the vane-accommodating-groove-forming portions is provided on a position of a surface of the upper die which faces the mold cavity, the position corresponding to the center of the bottom surface of the lower die.

7) A seventh embodiment of the present invention for solving the aforementioned problems provides a forging die according to any one of 1) through 6), wherein the upper die has a depression on a surface facing the mold cavity at a position which corresponds to each of the vane-accommodating-groove-forming portions, the depression being dented in a direction opposite the operation direction of the upper die.

8) An eighth embodiment of the present invention for solving the aforementioned problems provides a closed forging production system comprising an apparatus for cutting a material and a forging machine, wherein the forging machine includes a forging die as recited in any one of 1) through 7).

9) A ninth embodiment of the present invention for solving the aforementioned problems provides a method for producing an aluminum-alloy-made rotor, comprising forging a forging material into a rotor with a forging die as recited in any one of 1) through 7), an aluminum alloy cast bar, a material obtained through extrusion of an aluminum alloy cast bar, or a material obtained through extrusion of aluminum alloy powder, which serves as a forging material.

10) A tenth embodiment of the present invention for solving the aforementioned problems provides a cylindrical aluminum alloy rotor produced through forging, comprising a plurality of vane-accommodating grooves which extend toward an axis of the rotor, wherein the vane-accommodating grooves and a side wall of the cylindrical rotor which is segmented by the vane-accommodating grooves have no flash removal marks, and an edge portion formed by the segmented side wall and each of the grooves has a curvature radius of 0.5 mm or less.

BRIEF DESCRIPTION OF THE DRAWINGS

FIG. 6(A) illustrates a lower die of the present invention.

FIG. 6(B) illustrates a spacer of the present invention.

FIG. 7 is a schematic representation showing the forging production system of the present invention.

DESCRIPTION OF THE PREFERRED EMBODIMENTS

The forging die of the present invention will now be described.

Figure 9:
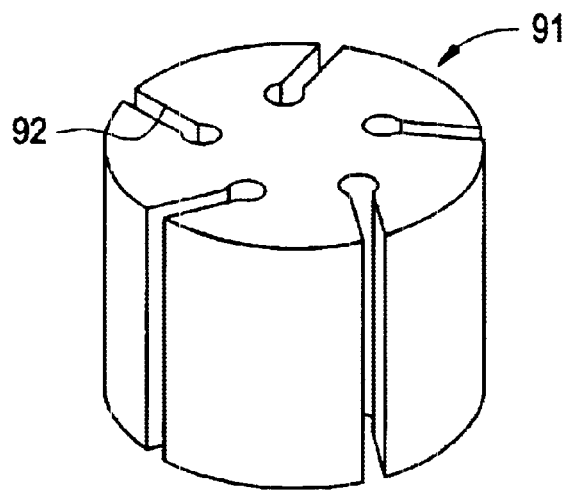
FIG. 9 shows an example of the rotor product of the present invention.

As shown in FIG. 9, the cylindrical rotor produced in the present invention has a side wall (91) and a plurality of vane-accommodating grooves (92) which extend toward the axis of the rotor.

The forging die employed for forging the rotor having a plurality of vane-accommodating grooves which extend toward the axis of the rotor includes an upper die and a lower die. The lower die includes a mold cavity for determining (defining) the shape of the rotor. A forging material is placed in the mold cavity, and the material is pressed by use of the upper die, to thereby forge the material into the rotor.

The lower die of the forging die of the present invention has a mold cavity in its center portion, and a plurality of vane-accommodating-groove-forming portions which protrude inward from the inner wall which defines the mold cavity. The forging die of the present invention includes a spacer disposed in the interior of the mold cavity of the lower die. A forging material is placed inside the spacer. The spacer has a plurality of shell segments for determining the shape of a side wall of the cylindrical rotor which is segmented by the vane-accommodating grooves, and a flange for joining the shell segments.

Figure 1A:
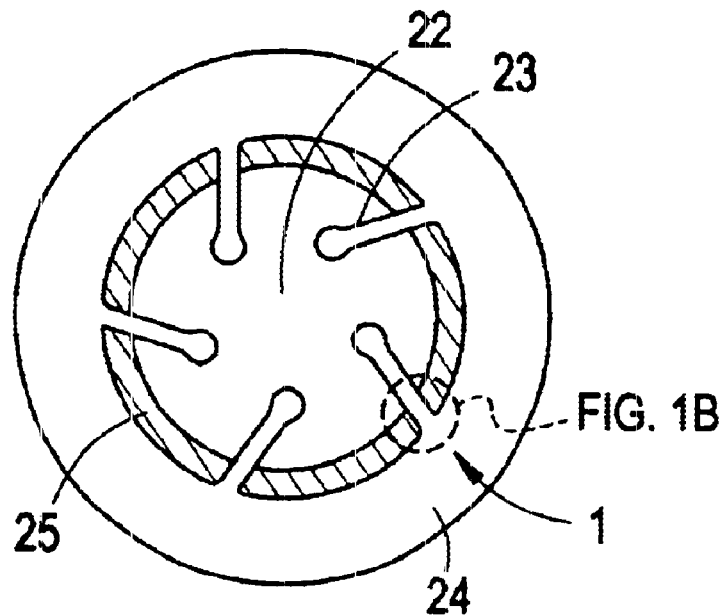
FIG. 1(A) is a horizontal cross-sectional view showing the entirety of an embodiment of the lower die of the present invention.
Figure 2A:
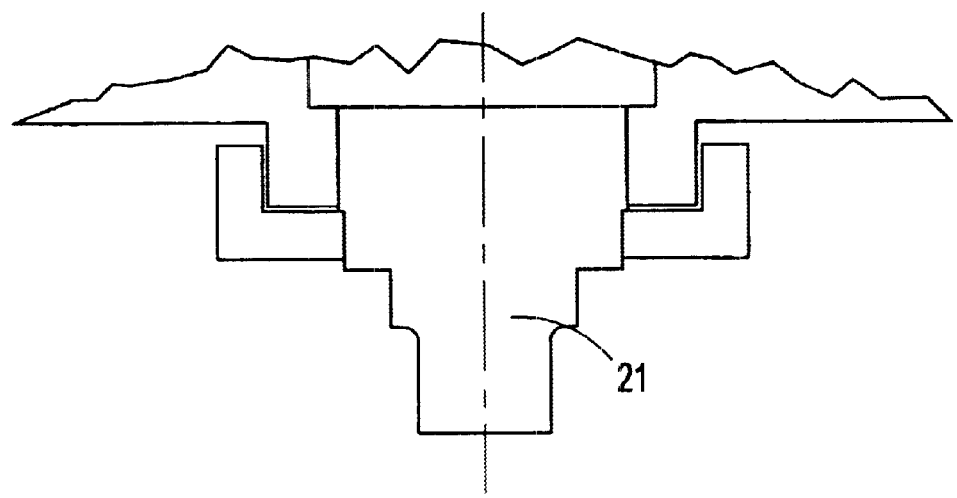
FIG. 2(A) is a vertical cross-sectional view showing an embodiment of an upper die of the forging machine of the present invention.
Figure 4:
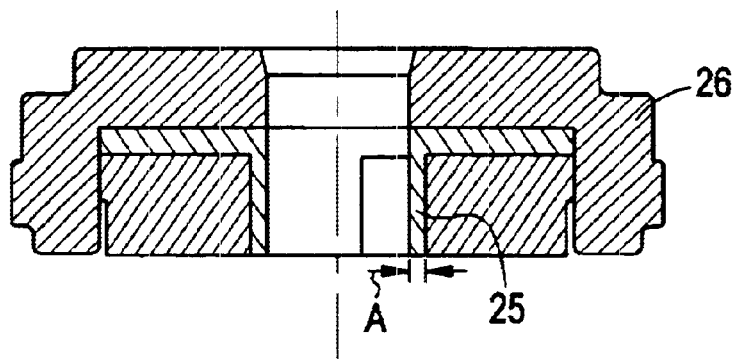
FIG. 4 is a partial vertical cross-sectional view showing an embodiment of the forging die of the present invention.

FIGS. 2(A) and (B) show a vertical cross-sectional view of an embodiment of the forging die of the present invention. FIG. 4 shows an enlarged view of the lower die. FIG. 1(A) shows a cross-sectional view of the lower die taken along line A-B shown in FIGS. 2(A) and (B).

Figure 1B:
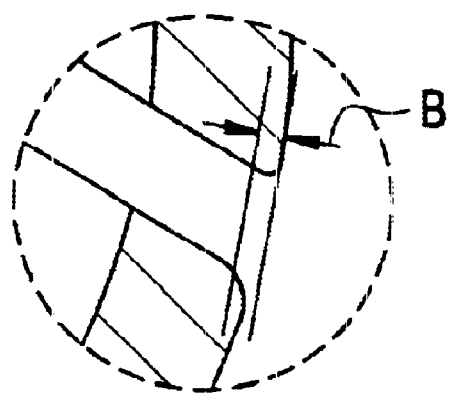
FIG. 1(B) is an enlarged view of a portion of the lower die shown in FIG. 1(A) and showing a base of a vane-accommodating-groove-forming portion.

The forging die includes an upper die (21) serving as a pressurizing punch; a lower die (24) having five vane-accommodating-groove-forming portions (23) which protrude inward from the inner wall which defines a mold cavity (22); a spacer (25) for forming the side wall of a cylindrical rotor; a bush (26) for securing the spacer to the lower die; and a knock-out pin (27) for removing a product from the forging die. FIG. 1(A) shows the lower die having the five vane-accommodating-groove-forming portions (23) which protrude inward from the inner wall which defines the mold cavity (22), and the spacer (25). In the case of a conventional forging die, a chamfer must be provided between the inner wall which defines a mold cavity and a base of a vane-accommodating-groove-forming portion to which stress is applied, in order to enhance the strength of the base. In contrast, in the forging die of the present invention, since the spacer is provided, concentration of stress applied to a base (1) of the vane-accommodating-groove-forming portion is reduced. Therefore, provision of a chamfer to the base (1) is not required, or the curvature radius of the chamfer can be reduced as compared with the case of the conventional forging die. In the conventional forging die, the chamfer must have a curvature radius of 2 to 3 mm. In contrast, in the forging die of the present invention, provision of a chamfer is not required, or the curvature radius as shown by reference letter B of FIG. 1(B) can be reduced as compared with the case of the conventional forging die.

Preferably, a chamfer is provided between the base of the vane-accommodating-groove-forming portion of the lower die and the inner wall which defines the mold cavity, in order to attain excellent tribological characteristics between the lower die and the spacer.

An embodiment of the spacer employed in the present invention will be specifically described with reference to FIGS. 3(A) and (B). Shell segments (32) are segmented by grooves (31) for mating the vane-accommodating-groove-forming portions which protrude inward from the inner wall which defines the mold cavity. The shape of an inner wall (33) of each of the shell segments corresponds to the shape of the side wall of a cylindrical rotor which is segmented by vane-accommodating grooves. The upper portion of each of the shell segments is joined to a flange (34).

The shell segments may be mechanically joined to the flange such that the resultant joint surface is not in contact with the side wall of the cylindrical rotor. Examples of the mechanical joining technique include caulking, welding, shrinking, and screwing. When shell segments having inner walls of different shapes are joined to the flange, a cylindrical rotor having side wall segments assuming different shapes, which are segmented by vane-accommodating grooves, can be easily produced.

Preferably, the spacer includes the shell segments and the flange formed in a united fashion. This is advantageous because the mechanical strength of the spacer can be enhanced.

The thickness (A) of each of the shell segments of the spacer as measured from the inner wall which defines the mold cavity toward the center of the spacer (shown in FIG. 4) is preferably $\frac{1}{10}$ to $\frac{1}{2}$ (more preferably $\frac{1}{5}$ to $\frac{1}{4}$) the length of each of the vane-accommodating-groove-forming portions. Such a range is advantageous because, when the thickness (A) is at least $\frac{1}{10}$ the length of the vane-accommodating-groove-forming portion, deviation of the vane-accommodating-groove-forming portion of the lower die can be sufficiently prevented. When the thickness (A) exceeds $\frac{1}{2}$ the length of the vane-accommodating-groove-forming portion, the length of a portion of the vane-accommodating-groove-forming portion that is masked by the spacer and not subjected to practical working becomes longer than that of a portion of the groove-forming portion that is subjected to practical working, and thus a lower die of large diameter is required. As a result, a large-size press machine is required for forging, and a large cost is required for production equipment. When the thickness (A) falls within the above range, deviation of the vane-accommodating-groove-forming portion of the lower die can be sufficiently prevented without use of a large-size press machine, and dimensional accuracy of the resultant vane-accommodating groove can be enhanced.

The thickness (A) of each of the shell segments of the spacer as measured from the inner wall which defines the mold cavity toward the center of the spacer (shown in FIG. 4) is preferably 1 to 20 times the maximum curvature radius of the chamfer. For example, the thickness (A) of the shell segment of the spacer as shown in FIG. 4 is preferably 1 to 20 times the length of the chamfer provided at the base of the vane-accommodating-groove-forming portion of the lower die. See reference letter (B) of FIG. 1(B). When the thickness (A) is less than the maximum curvature radius of the chamfer, the shape of the chamfer is reflected in the side wall of a cylindrical rotor, and the resultant chamfer of the rotor must be removed in an additional step after forging. Furthermore, since the vane-accommodating-groove-forming portion is insufficiently supported, deviation of the groove-forming portion tends to occur during forging, and working accuracy of the resultant vane-accommodating groove may fail to become reliable. In contrast, when the thickness (A) exceeds 20 times the maximum curvature radius of the chamfer, the length of a portion of the vane-accommodating-groove-forming portion that is masked by the spacer and is subjected to practical working becomes long, and thus a lower die of large diameter must be employed in practice. As a result, a large-size press machine is required for forging, and large cost is required for production equipment. When the thickness (A) is 1 to 20 times the maximum curvature radius of the chamfer, deviation of the vane-accommodating-groove-forming portion of the lower die can be sufficiently prevented without use of a large-size press machine, and dimensional accuracy of the resultant vane-accommodating groove can be enhanced.

The axial length of the shell segments of the spacer will be described with reference to FIG. 5(A).

In the present invention, the axial length (D) of each of the shell segments of the spacer is preferably equal to or greater than the axial length (E) of a forged rotor and twice or less the axial length (E) of the rotor. As a result, since, by virtue of the presence of the spacer, the forged rotor is not in contact with a die division surface (H), flash attributed to the die division surface is not generated. When the axis-directional length (D) of the shell segment of the spacer is less than the difference between the axial length (E) of the forged rotor and the axial length (F) of the vane-accommodating-groove-forming portion, flash attributed to the die division surface may be generated. When the axial length (D) of the shell segment of the spacer exceeds twice the axial length (E) of the forged rotor, a pressing machine having a length more than three times the length of a final product is required; i.e., a large-size pressing machine must be employed, which is not economically advantageous.

Since no flash is generated on the rotor of the present invention, the following effects are obtained.

(1) Since no flash remains in the forging die, no depression, which would be attributed to flash remaining in the die, is formed on the surface of a product (rotor) to be forged in the same forging die; i.e., generation of a poor product can be prevented.

(2) During machining (i.e., the subsequent process) of the rotor, chances of a chucking miss attributed to flash can be reduced, or oblique chucking (i.e., oblique chucking of the rotor) can be prevented.

(3) The number of steps for removing flash in the subsequent process can be reduced.

The thickness (J) of the flange is preferably equal to or greater than the difference between the axial length (E) of the forged rotor and the axial length (F) of the vane-accommodating-groove-forming portion, and twice or less the axial length (E) of the forged rotor. More preferably, the thickness (J) of the flange is equal to or greater than the difference between the axial length (E) of the forged rotor and the axial length (F) of the vane-accommodating-groove-forming portion, and 1.5 times or less the axial length (E) of the forged rotor. Such a range is advantageous because, when the thickness (J) is equal to or greater than the difference between the axial length (E) and the axial length (F), no flash is generated, and when the thickness (J) is twice or less the axial length (E), a large-size pressing machine is not necessarily required.

Figure 5A:
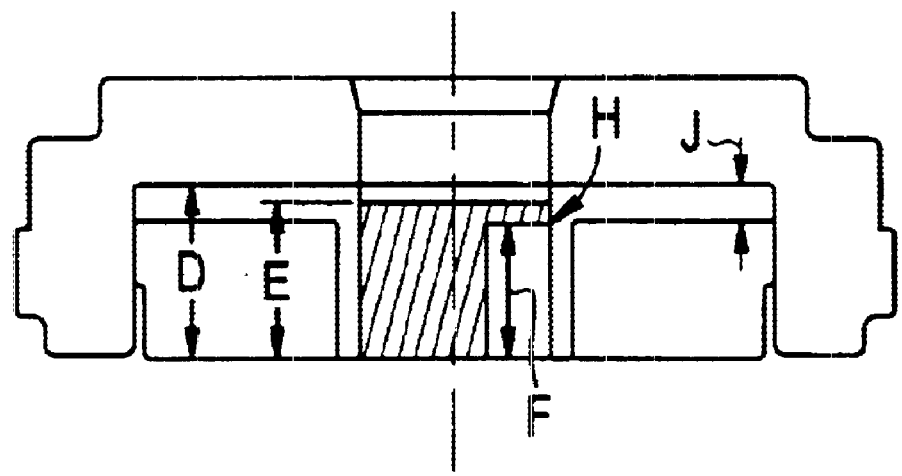
FIG. 5(A) illustrates a vertical cross-sectional view of a forging die and is a representation for explaining the length of a shell segment of an embodiment of the spacer of the present invention.
Figure 5B:
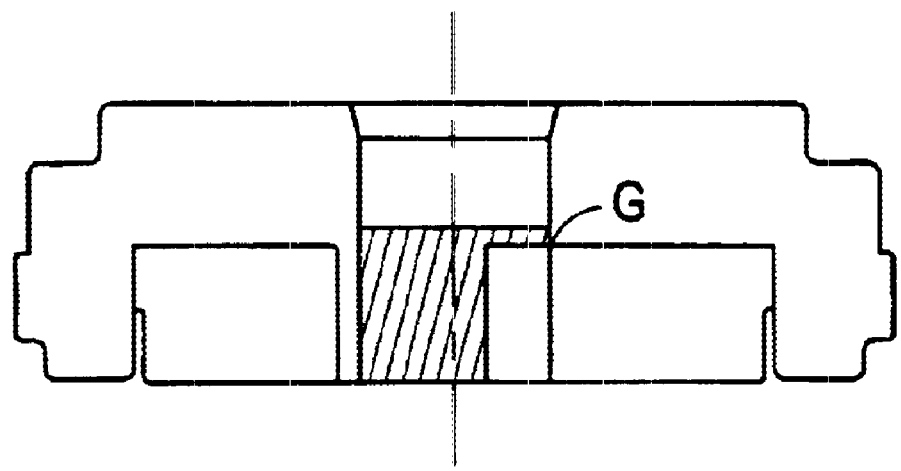
FIG. 5(B) illustrates a vertical cross-sectional view of a conventional forging die.

When a conventional forging die shown in FIG. 5(B) is employed, flash may be generated at a die division surface (G). However, in the forging die of the present invention, since a material is not brought into contact with the die division surface, generation of flash can be prevented.

The surface roughness (Ra) of the inner wall of the flange is preferably 0.05 to 25 $\mu$m, more preferably 0.05 to 1.6 $\mu$m. Such a range is advantageous because, when the surface roughness (Ra) is less than 0.05 $\mu$m, sufficient working accuracy of the flange is difficult to obtain, whereas when the surface roughness (Ra) exceeds 25 $\mu$m, sticking between the flange and a rotor occurs during forging.

The flange does not necessarily assume a doughnut-like shape, and the flange may be designed so as to assume a shape suitable for incorporation into the lower die or the bush.

An example of combination of the lower die and the spacer of the present invention will be described with reference to FIGS. 2, 4, and 6. As shown in FIGS. 6(A) and (B), the spacer is fit into the lower die such that the grooves of the spacer are mated with the vane-accommodating-groove-forming portions of the lower die, and the spacer is united with the lower die. In order to unite the spacer with the lower die with high strength, the spacer may be shrunk with the lower die. As shown in FIG. 4, the thus-united lower die and spacer are placed into the bush. Furthermore, the lower die, the spacer, and the bush are placed on an anvil of a pressing machine as shown in FIGS. 2(A) and (B). The clearance between each of the vane-accommodating-groove-forming portions of the lower die and each of the grooves of the spacer is preferably $\frac{1}{1,000}$ to $\frac{1}{10}$ the thickness of the vane-accommodating-groove-forming portion, more preferably $\frac{1}{250}$ to $\frac{1}{100}$ the thickness of the vane-accommodating-groove-forming portion. When the clearance is less than $\frac{1}{1,000}$ the thickness of the vane-accommodating-groove-forming portion, fitting of the spacer into the vane-accommodating-groove-forming portions becomes difficult. In contrast, when the clearance exceeds $\frac{1}{10}$ the thickness of the vane-accommodating-groove-forming portion, bending of the vane-accommodating-groove-forming portions is insufficiently prevented, and flash may be generated in the clearance between the groove-forming portions and the grooves of the spacer. The surface roughness (Ra) of the vane-accommodating-groove-forming portions is preferably 0.05 to 25 $\mu$m, more preferably 0.05 to 1.6 $\mu$m. Such a range is advantageous because, when the surface roughness (Ra) falls within the above range, sufficient working accuracy can be obtained, and sticking between the lower die and a rotor can be prevented. The surface roughness (Ra) of the grooves of the spacer for mating the vane-accommodating-groove-forming portions is preferably 0.2 to 6.3 μm, more preferably 0.2 to 1.6 μm. When the surface roughness (Ra) is less than 0.2 μm, sufficient working accuracy is difficult to obtain, whereas when the surface roughness (Ra) exceeds 6.3 μm, fitting of the spacer into the lower die becomes difficult.

The clearance between the inner wall which defines the mold cavity of the lower die and each of the shell segments of the spacer is preferably $1/1,000$ to $1/10$ the thickness (A) of the shell segment of the spacer, more preferably $1/250$ to $1/100$ the thickness (A). When the clearance is less than $1/1,000$ the thickness (A), fitting of the spacer into the vane-accommodating-groove-forming portions becomes difficult. In contrast, when the clearance exceeds $1/10$ the thickness (A), the shell segments of the spacer are deformed due to stress applied to the shell segments during forging. The surface roughness (Ra) of the inner wall which defines the mold cavity of the lower die is preferably 0.2 to 6.3 μm, more preferably 0.2 to 1.6 μm. Such a range is advantageous because, when the surface roughness (Ra) is less than 0.2 μm, sufficient working accuracy is difficult to obtain, whereas when the surface roughness (Ra) exceeds 6.3 μm, fitting of the spacer into the lower die becomes difficult. The surface roughness (Ra) of the side wall of each of the shell segments which are in contact with the inner wall which defines the mold cavity is preferably 0.2 to 6.3 μm, more preferably 0.2 to 1.6 μm. Such a range is advantageous because, when the surface roughness (Ra) is less than 0.2 μm, sufficient working accuracy is difficult to obtain, whereas when the surface roughness (Ra) exceeds 6.3 μm, fitting of the spacer into the lower die becomes difficult.

An example of the production method for the spacer employed in the present invention will now be described. Examples of the material of the spacer include die steel (JIS SKD11). The material is subjected to machining and electro-discharge forming, to thereby form the spacer having the shell segments and the flange. For example, the outer side walls and inner side walls of the shell segments of the spacer are formed through machining in a circumferential direction, and then the grooves for mating the vane-accommodating-groove-forming portions are formed through elecro-discharge forming in a radial direction. As described above, preferably, the side walls of the shell segments and the grooves for mating the vane-accommodating-groove-forming portions have predetermined dimensional accuracy. When the two types of working techniques are employed in combination, sufficient working accuracy can be attained. Working accuracy in a circumferential direction can be enhanced through machining, but machining fails to attain high working accuracy in a radial direction. Therefore, in order to obtain high dimensional accuracy, working in a circumferential direction is carried out through machining, and working in a radial direction is carried out through electro-discharge forming.

The forging production system employed in the forging method of the present invention will next be described.

An example configuration of the forging production system will be described with reference to FIG. 7.

The forging production system includes a material cutting apparatus (71) and a forging machine (75). In the case of hot forging in which a forging material is subjected to forging after the material is heated to a temperature equal to or higher than its recrystallization temperature, the production system preferably includes a material-heating apparatus (73) in order to enhance forgeability of the material. More preferably, the production system also includes a material feeding apparatus (72), a material conveying apparatus (74), and a forged-product-conveying apparatus (76), so as to realize a completely automatic production system. When a forged product assumes the shape of a final product, a forged product heat treatment furnace (77) is preferably provided.

The material cutting apparatus (71) is provided for cutting a continuously cast round bar into pieces of predetermined length. The material feeding apparatus (72) is provided for storing a predetermined amount of a forging material in a hopper, and then feeding the material to the subsequent apparatus. The material conveying apparatus (74) is provided for conveying the forging material to a die. The forging machine (75) is provided for subjecting the forging material to forging. The forged-product-conveying apparatus (76) is provided for discharging a forged product from the die by means of a knock-out mechanism, and then conveying the forged product to the subsequent apparatus. The material heating apparatus (73) is provided for heating the material to a temperature equal to or higher than its recrystallization temperature to thereby enhance forgeability thereof. The forged product heat treatment furnace (77) is provided for subjecting the resultant forged product to heat treatment; i.e., solid solution treatment and aging treatment performed continuously.

Figure 2B:
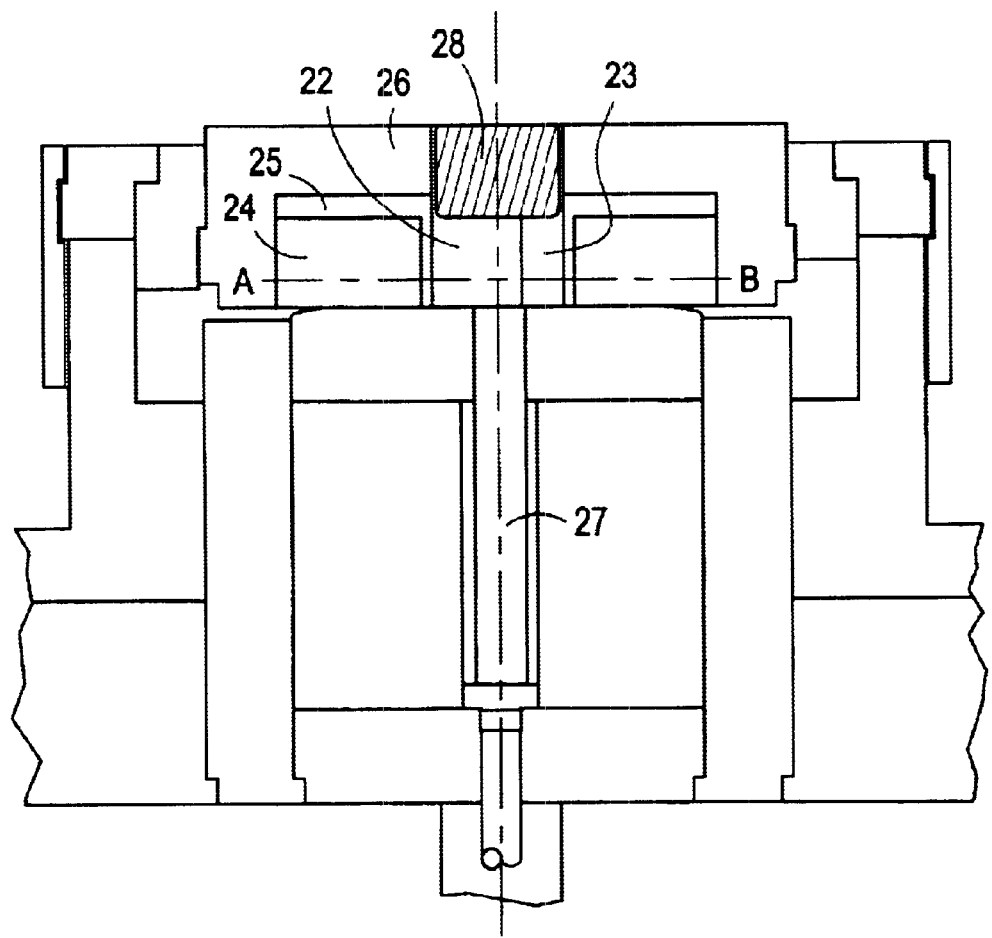
FIG. 2(B) is a vertical cross-sectional view showing an embodiment of a lower die of the forging machine of the present invention.

As shown in FIGS. 2(A) and 2(B), there is mounted on the forging machine the forging die including a lower die having a mold cavity in its center portion, and a plurality of vane-accommodating-groove-forming portions which protrude inward from the inner wall which defines the mold cavity; and a spacer having a plurality of shell segments for determining a shape of a side wall of the cylindrical rotor which is segmented by the vane-accommodating grooves, and a flange for joining the shell segments, the spacer being provided in the interior of the mold cavity of the lower die.

If desired, for example, in the case of hot forging in which a forging material is subjected to forging after the material is heated to a temperature equal to or higher than its recrystallization temperature, a lubricant spraying apparatus for spraying a lubricant to the die is preferably provided on the forging die or in the forging machine. The lubricant spraying apparatus may be provided separately from the forging machine, and operation of the apparatus may be linked with that of the forging machine.

In the production method of the present invention, the forging material may be a metallic material. Examples of the metallic material include aluminum, iron, magnesium, and an alloy predominantly containing such a metal. Examples of the aluminum alloy include AA standard A390 alloy and JIS 6061 alloy.

The forging material employed in the present invention may be produced by means of any customary method, such as continuous casting, extrusion, or rolling. Examples of the forging material include an aluminum alloy cast bar, a material obtained through extrusion of an aluminum alloy cast bar, or a material obtained through extrusion of aluminum alloy powder. A continuously cast round bar material of aluminum or aluminum alloy is preferred, in view of low cost. A round bar material of aluminum alloy (e.g., SHOTIC material (product of Showa Denko K. K.)) which is continuously cast by means of an air-pressurized hot top casting process is more preferred, since the material exhibits excellent soundness and has fine crystal grains, the grains exhibiting no anisotropy attributed to plastic working. The reason for the above is as follows. In the forging method of the present invention, when the round bar material of aluminum alloy (i.e., a forging material) is employed, stratiform plastic flow of the material occurs uniformly in branches of a forged product, resulting in generation of no forging defects such as underfill, and enhancement of the mechanical strength of the product.

An embodiment of the production method of the present invention employing the forging production system shown in FIG. 7 and the forging machine shown in FIGS. 2(A) and (B) will next be described.

The forging method of the present invention includes:

1) a step for cutting a continuously cast round bar into pieces of predetermined length;
2) a step for conveying a forging material to a die;
3) a step for subjecting the forging material to forging;
4) a step for discharging a forged product from the die by means of a knock-out mechanism;
5) a step for cutting the forged product such that the cut forged product has a length equal to or less than the axial length of a vane-accommodating groove, to thereby cause the groove to extend in the axial direction throughout the cut forged product; and
6) a heat treatment step for subjecting the resultant forged product to solid solution treatment and aging treatment performed continuously.

In the case of cold forging in which a forging material is forged at ambient temperature to thereby produce a forged product having a simple shape, from the viewpoints of reduction of forging load and prevention of sticking between a forged product and a die, if desired, a bond treatment step in which the forging material is subjected to chemical coating treatment is preferably carried out prior to the forging step.

In the case of hot forging in which a forging material is heated to a temperature equal to or higher than its recrystallization temperature and then forged to thereby produce a forged product having a complicated shape, from the viewpoints of reduction of forging load and prevention of sticking between a forged product and a die, if desired, any one or more of the following steps is preferably carried out: a step for pre-heating a forging material to a temperature equal to or higher than its recrystallization temperature, a step for subjecting a forging material to water-soluble graphite lubrication treatment prior to forging, a step for pre-heating a forging die to a predetermined temperature, and a step for spraying a water-soluble graphite lubricant onto a portion of a forging die in which a forging material is forged.

The forging die is preferably heated to 100 to 400° C. by use of a heater (not illustrated), and maintained at the temperature. The forging material is preferably heated to 300 to 450° C.

The forging die (which includes a lower die having a mold cavity in its center portion, and a plurality of vane-accommodating-groove-forming portions which protrude inward from the inner wall which defines the mold cavity; and a spacer having a plurality of shell segments for determining a shape of a side wall of a cylindrical rotor which is segmented by the vane-accommodating grooves, and a flange for joining the shell segments, the spacer being provided in the interior of the mold cavity of the lower die) is secured by use of the bush (26), and a forging material (28) is placed in the forging die. See FIGS. 2(A) and (B). After the forging material is subjected to forging under application of a forging load of 40 to 170 t by use of the punch (21), the resultant rotor is removed from the lower die to above by use of the knock-out pin (27).

Figure 8:
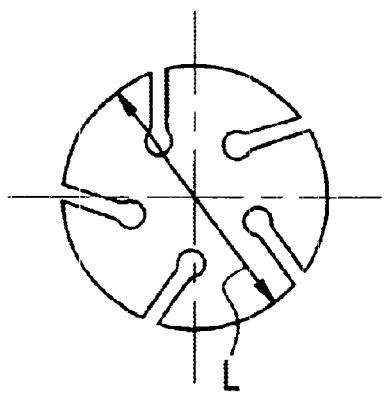
FIG. 8 is a horizontal cross-sectional view showing an example of a rotor forged through the method of the present invention.

In the production method of the present invention, a forging material is subjected to plastic working in a space defined by (a) the upper die; (b) the lower die having a mold cavity and a plurality of vane-accommodating-groove-forming portions which protrude inward from the inner wall which defines the mold cavity; and (c) a spacer having a plurality of shell segments for determining a shape of a side wall of the cylindrical rotor which is segmented by the vane-accommodating grooves, and a flange for joining the shell segments, the spacer being provided in the interior of the mold cavity of the lower die. That is, closed forging is carried out in the production method, unlike the case where a forging material is subjected to plastic working with flash being formed at the periphery of a die. Through the production method, a rotor having no flash on its periphery can be produced, without employing a step for removing, through press working, flash generated around the vane-accommodating grooves. Since the production method does not require an additional molding step such as a flash removing step or a press working step, the production process can be simplified. In addition, since disposal of the forging material is not required in the molding step of the production method, yield of a product on the basis of the forging material can be enhanced. FIG. 8 shows a cross-sectional view of a rotor produced through the production method of the present invention, and FIG. 9 shows the appearance of the rotor.

The forging production system of the present invention includes the forging machine having the forging die including a lower die having a mold cavity in its center portion, and a plurality of vane-accommodating-groove-forming portions which protrude inward from the inner wall which defines the mold cavity; and a spacer having a plurality of shell segments for determining a shape of a side wall of a cylindrical rotor which is segmented by the vane-accommodating grooves, and a flange for joining the shell segments, the spacer being provided in the interior of the mold cavity of the lower die. Therefore, vane-accommodating grooves of high accuracy can be formed, working for removing chamfers of the vane-accommodating grooves can be obviated or reduced, and a rotor of high dimensional accuracy can be produced at low cost.

The production method of the present invention employs the forging die including a lower die having a mold cavity in its center portion, and a plurality of vane-accommodating-groove-forming portions which protrude inward from the inner wall which defines the mold cavity; and a spacer having a plurality of shell segments for determining a shape of a side wall of a cylindrical rotor which is segmented by the vane-accommodating grooves, and a flange for joining the shell segments, the spacer being provided in the interior of the mold cavity of the lower die. Therefore, vane-accommodating grooves of high accuracy can be formed, working for removing chamfers of the vane-accommodating grooves can be obviated or reduced, and a rotor of high dimensional accuracy can be produced at low cost.

The vane-accommodating-groove-forming portions of the forging die of the present invention are united with the shell segments for determining a shape of a side wall of a cylindrical rotor. Therefore, since the accuracy of the vane-accommodating-groove-forming portions is reflected in working accuracy, the resultant rotor exhibits high accuracy. Since the vane-accommodating-groove-forming portions are not required to be shrunk with the shell segments, a shrinking step is not necessary. Therefore, when a die for forming the vane-accommodating-groove-forming portions is produced, dimensional accuracy can be easily controlled.

In general, in a conventional method, when the number of vane-accommodating-groove-forming portions is increased, the number of the groove-forming portions which are subjected to shrinking is increased, and the number of control items, including temperature control during shrinking and dimensional control of shrinking allowance, is increased, rendering accuracy control difficult. However, in the present invention, when the number of vane-accommodating-groove-forming portions is increased, merely increasing the number of the grooves of the spacer and dimensional control of fin portions (i.e., the vane-accommodating-groove-forming portions) are required.

In the production method employing the forging die of the present invention, pressure is applied, by use of a press, to an aluminum alloy material placed in the forging die (including a lower die having a mold cavity in its center portion, and a plurality of vane-accommodating-groove-forming portions which protrude inward from the inner wall which defines the mold cavity; and a spacer having a plurality of shell segments for determining a shape of a side wall of a cylindrical rotor which is segmented by the vane-accommodating grooves, and a flange for joining the shell segments, the spacer being provided in the interior of the mold cavity of the lower die) to thereby form vane-accommodating grooves. Therefore, twisting and bending of the vane-accommodating grooves can be prevented, unlike the case where vane-accommodating grooves are formed through extrusion.

Since the spacer is present between the aluminum alloy material and the lower die, the shape of the chamfers of the vane-accommodating-groove-forming portions is not reflected in a forged product. Therefore, the amount of excess material required for removing the chamfers of the forged product is reduced, or the excess material is not necessary. As a result, the time consumed by a step for removing the excess material can be reduced, or the removing step can be obviated.

That is, since no chamfer is provided between each of the vane-accommodating-groove-forming portions and the inner wall of a shell segment of the spacer, the resultant forged product contains substantially no chamfer R, and thus the amount of excess material required for removing chamfers can be reduced. The curvature radius of the chamfer R of a rotor produced through the method of the present invention is 0.5 mm or less, preferably 0.1 mm or less. The curvature radius is reduced to such a preferred level by regulating forging conditions and appropriately selecting the forging material.

When the vane-accommodating-groove-forming portions are united with the spacer, the groove-forming portions are not subjected to considerable deviation.

When the clearance between the spacer and the vane-accommodating-groove-forming portions is sufficiently reduced, formation of flash-like excess material on the periphery of a rotor can be prevented.

The production method of the present invention can produce a forged cylindrical aluminum alloy rotor having a plurality of vane-accommodating grooves, in which the vane-accommodating grooves and the side wall of the cylindrical rotor which is segmented by the vane-accommodating grooves have no flash removal marks, and an edge portion formed by the segmented side wall and each of the grooves has a curvature radius of 0.5 mm or less.

In the rotor of the present invention, the vane-accommodating grooves and the side wall have no flash removal marks, and an edge portion formed by the segmented side wall and each of the grooves has a curvature radius of 0.5 mm or less. Therefore, since working for removing flashes and chamfers is not required, the number of working steps is reduced, and the yield of the rotor on the basis of the raw material that is being forged is enhanced.

Another preferred embodiment of the present invention will be described with reference to FIG. 10.

Figure 22:
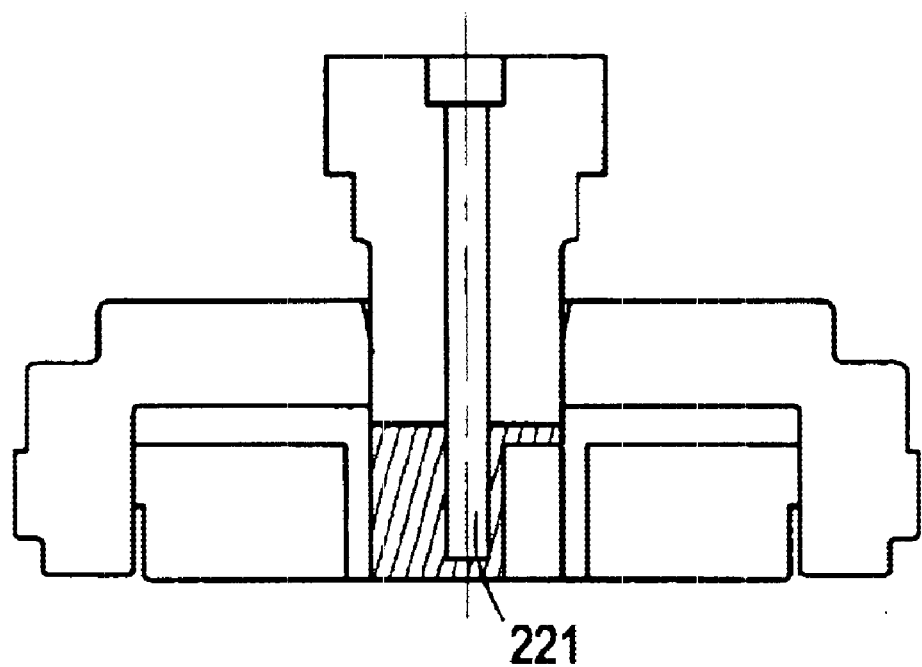
FIG. 22 shows yet another embodiment of the upper die of the present invention.

In some cases, because of its use, a rotor is required to have a hole parallel to vane-accommodating grooves; for example, a rotor is required to have, in its center, a hole through which a shaft penetrates. When a protrusion is provided on a forging die, such a hole can be formed during forging of a rotor. Preferred embodiments of the forging die of the present invention employed for forming such a hole will be described below. As shown in FIG. 10, preferably, the forging die shown in FIGS. 2(A) and (B) further includes, on the center of the bottom surface of the lower die, a cylindrical protrusion (101) for forming a center hole, which has a maximum radius less than the distance between the center of the mold cavity and each of the vane-accommodating-groove-forming portions. Preferably, as shown in FIG. 22, the forging die shown in FIGS. 2(A) and (B) further includes a cylindrical protrusion (221) for forming a center hole, which has a maximum radius less than the distance between the center of the mold cavity of the lower die and each of the vane-accommodating-groove-forming portions, and which is provided on a position of the surface of the upper die which faces the mold cavity, the position corresponding to the center of the bottom surface of the lower die.

In the case where a protrusion for forming a center hole is provided, the spacer of the present invention exerts the below-described effects. When a cylindrical cavity is formed through forging by use of a conventional forging die, high stress is applied to vane-accommodating-groove-forming portions, and thus the groove forming portions may be bent, resulting in poor positional accuracy. In contrast, when a cylindrical cavity is formed through forging by use of the forging die of the present invention, stress applied to the vane-accommodating-groove-forming portions is lowered sufficiently by means of the spacer, and thus bending of the groove-forming portions is reduced, resulting in high positional accuracy. When the side wall of a rotor, vane-accommodating grooves, and a center hole of the rotor for a shaft are formed simultaneously through pressing by means of the method of the present invention, high accuracy is attained, and production costs can be reduced.

Yet another preferred embodiment of the present invention will be described with reference to FIG. 11.

Figure 11:
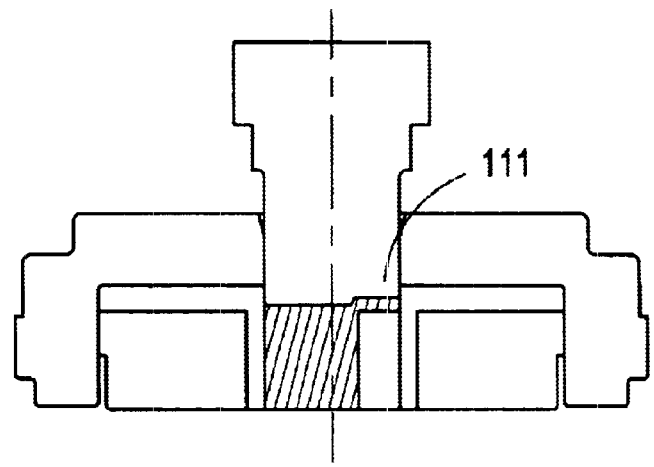
FIG. 11 shows another embodiment of the upper die of the present invention.

As shown in FIG. 11, preferably, the forging die shown in FIGS. 2(A) and (B) further includes, on the upper die, a depression (111) provided at a position which corresponds to, as viewed from above the upper die, each of the vane-accommodating-groove-forming portions, the depression being dented in a direction opposite the operation direction of the upper die. When such a depression is provided, a "dowel" can be formed on the upper wall of a cylindrical rotor with no flashes being formed. When a "dowel" is formed by use of a conventional forging die, due to high pressure applied to a protrusion of a punch, large pieces of flash may be generated in a die division surface. In contrast, in the present invention, since a forged product is not in contact with a die division surface, by virtue of the presence of the spacer, no flash is generated. Therefore, even when a "dowel" is formed, the yield of the forged product on the basis of the material therefore can be enhanced. As used herein, the term "dowel" refers to a portion corresponding to the depression (111) which is dented in a direction opposite the direction of pressure application by use of the punch.

When pressing is carried out by use of the lower die, the spacer, and the upper die having the aforementioned portion corresponding to the "dowel" of the present invention, stress applied to the vane-accommodating-groove-forming portions, the stress being attributed to a pressed forging material, can be reduced, and wear of the groove-forming portions can be reduced. Therefore, since a large number of forged products can be produced by use of the same forging die, production costs can be reduced. A portion of the pressurizing punch which protrudes as viewed on the basis of the depression substantially exerts the effect of reducing the amount of excess material.

Figure 12A:
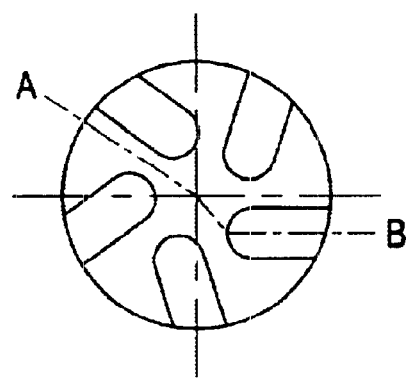
FIG. 12(A) is a plan view showing a forged product produced through the method of the present invention.
Figure 12B:
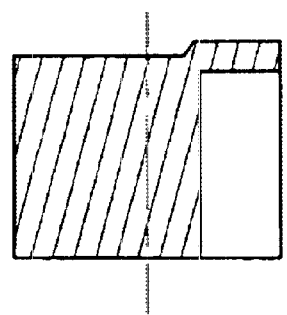
FIG. 12(B) is a cross-sectional view of the forged product taken along line A-B of FIG. 12(A).
Figure 13A:
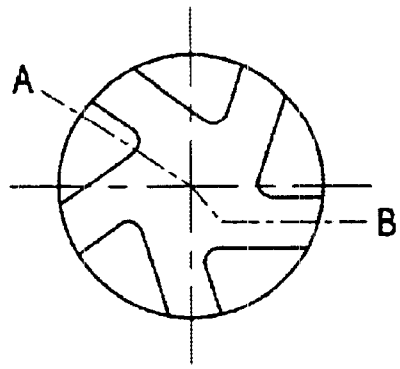
FIG. 13(A) is a plan view showing another forged product produced through the method of the present invention.
Figure 13B:
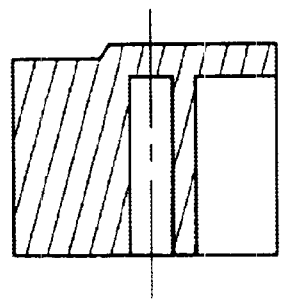
FIG. 13(B) is a cross-sectional view of the forged product taken along line A-B of FIG. 13(A).

FIGS. 13(A) and (B) show the appearance of a forged product having a center hole and a "dowel," and FIGS. 12(A) and (B) show the appearance of a forged product having a "dowel."

Figure 14:
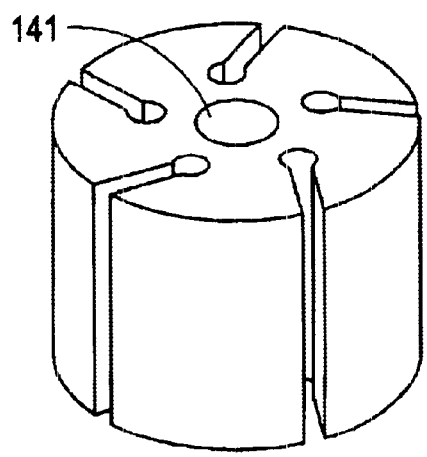
FIG. 14 shows another example of the rotor product of the present invention.
Figure 15:
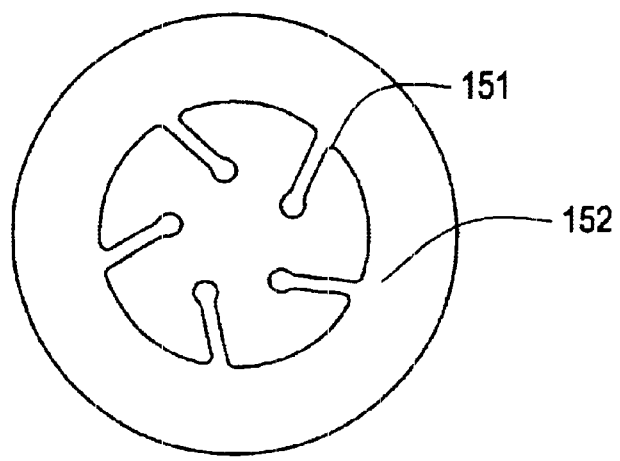
FIG. 15 shows an example of a conventional extrusion die.
Figure 16:
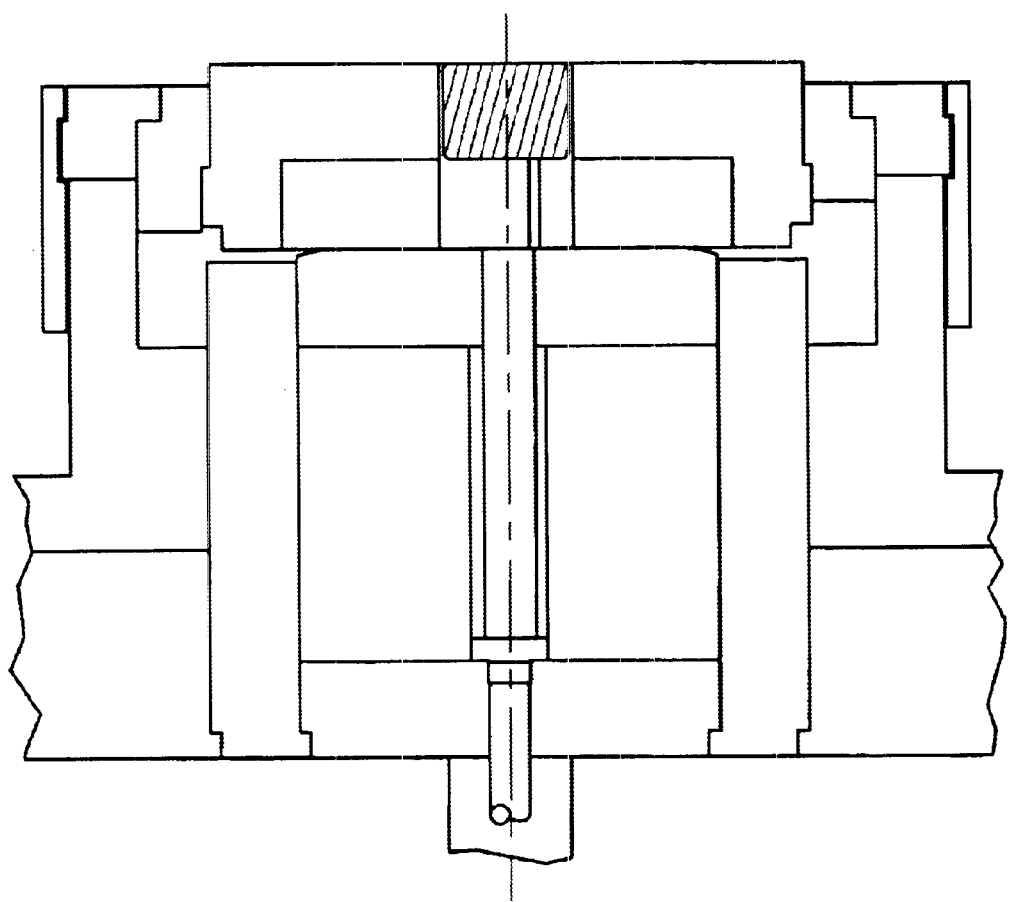
FIG. 16 shows an example of a conventional forging die.

FIG. 14 shows the appearance of a rotor product which is obtained by removing the "dowel" from the forged product of FIGS. 13(A) and (B) through mechanical working.

In the aforementioned embodiments of the forging die of the present invention, the pressurizing punch is provided above the lower die. However, the lower die may be provided above the pressurizing punch. Alternatively, the forging die may have a structure such that the pressurizing punch is operated in a horizontal direction.

EXAMPLES

The present invention will next be described in detail by way of Examples, which should not be construed as limiting the invention thereto.

Example 1

A rotor having an appearance shown in FIG. 9 (the cross-sectional view of the rotor is shown in FIG. 8) was produced by use of a forging die including a spacer shown in FIG. 4 (the cross-sectional view of the forging die is shown in FIGS. 2(A) and (B)). The forging die was heated to 180° C. by use of a heater, and maintained at the temperature. AA standard A390 aluminum alloy produced through a continuous casting method was formed into a cylindrical product (diameter: 57.2 mm) through hot extrusion, and the cylindrical product was cut into pieces having a length of 44 mm. The resultant piece was employed as a forging material. The forging material was heated to 420° C. The forging die was subjected to water-soluble graphite lubrication treatment. The spacer having shell segments (diameter of a hollow cylinder formed by the shell segments: 57.7 mm, thickness of each shell segment: 9 mm, width of a groove for mating a vane-accommodating-groove-forming portion: 3 mm, axial length of a shell segment: 60 mm) was combined with a lower die having five vane-accommodating-groove-forming portions at an interval of 720 (thickness of each portion: 2.995 mm, length of each portion: 18.7 mm, diameter of a cylindrical tip of each portion: 5.5 mm), and then secured by use of a bush. The curvature radius of a chamfer of the lower die was 2 mm.

The axial length of the mold cavity (the value of E of FIG. 5(A)) for forming a rotor is 45 mm; i.e., the axial length (60 mm) of a shell segment (the value of D of FIG. 5(A)) of the spacer is 1.3 times that of the mold cavity.

As described above, the thickness of the shell segment of the spacer as measured from the inner wall which defines the mold cavity toward the center of the spacer is 9 mm. That is, the thickness of the shell segment is about 0.48 times the length (18.7 mm) of the vane-accommodating-groove-forming portion.

As described above, the chamfer having a maximum radius of 2 mm is provided between the base of the vane-accommodating-groove-forming portion of the lower die and the inner wall which defines the mold cavity, and the thickness (9 mm) of the shell segment of the spacer is 4.5 times the maximum radius of the chamfer.

The forging material was placed in the forging die, and subjected to forging by use of a punch. The forging load was 51 t. After completion of forging, the resultant rotor was removed from the lower die in an upward direction by use of a knock-out pin.

Figure 17:
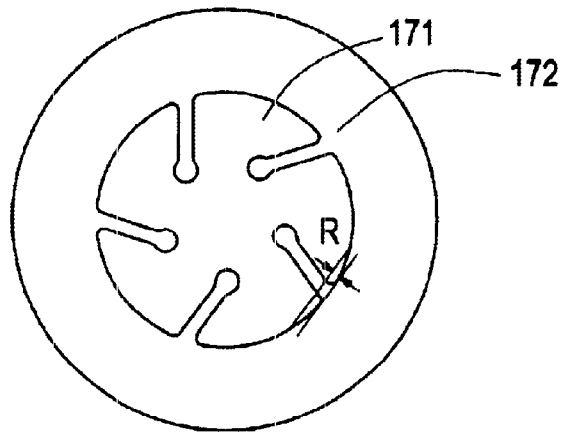
FIG. 17 shows an example of a lower die of a conventional forging die.
Figure 20:
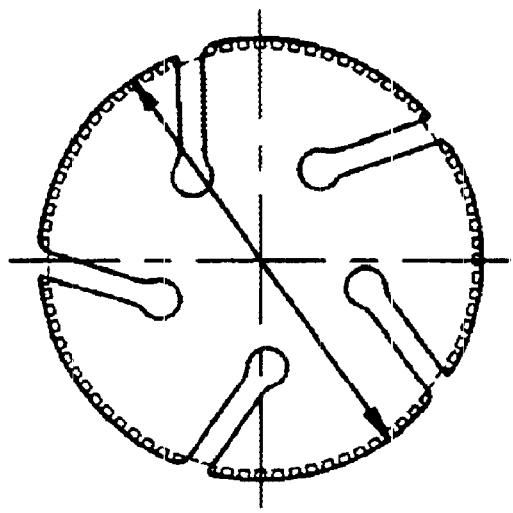
FIG. 20 shows a portion of a rotor forged through a conventional method.

For comparison, a rotor was produced through forging by means of a method employing a conventional die shown in FIG. 17. FIG. 20 shows the cross-sectional view of the rotor. The curvature radius of a chamfer of a lower die was 2 mm. Comparison between FIG. 8 and FIG. 20 reveals that, with reference to the cross-section of the peripheral excess material indicated by oblique lines in FIG. 20, the radius of the forged product produced through the method of the present invention is decreased by 1.5 mm (i.e., the curvature radius of the chamfer R of the product is decreased from 2 mm to 0.5 mm), and that the amount of excess material of the forged product of the present invention is reduced.

Figure 18:
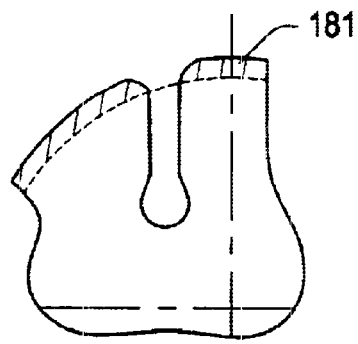
FIG. 18 shows a portion of a conventional forged rotor.
Figure 19:
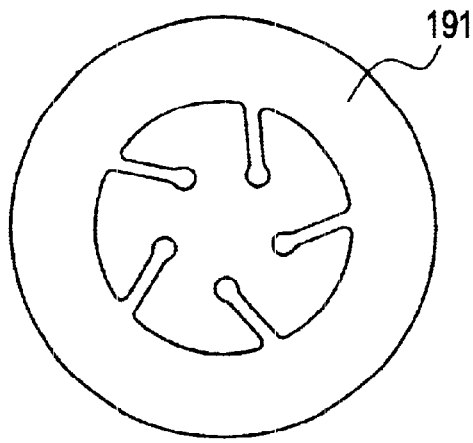
FIG. 19 shows another example of a lower die of a conventional forging die.

Specifically, the curvature radius of the chamfer R of the comparative forged product is 2 mm, and the radius and the diameter of the forged product (inclusive of the peripheral excess material) are 30.35 mm and 60.7 mm, respectively. In contrast, the curvature radius of the chamfer R of the forged product of Example 1 of the present invention is 0.5 mm, and the radius and the diameter (L of FIG. 8) of the forged product are 28.85 mm and 57.7 mm, respectively. That is, since the amount of excess material is reduced, the radius of the forged rotor of Example 1 is decreased by 1.5 mm. Comparison between FIG. 8 and FIG. 20 reveals that, since the forged rotor of Example 1 has no portion that corresponds to the cross-section of the peripheral excess material indicated by oblique lines in FIG. 20 (the enlarged view of the portion is shown in FIG. 18), the amount of excess material to be removed in the subsequent process (i.e., a mechanical working process for producing a final rotor product) is reduced, or such a removing process is obviated. Therefore, the yield of the forged rotor on the basis of the material therefor is enhanced.

Figure 21:
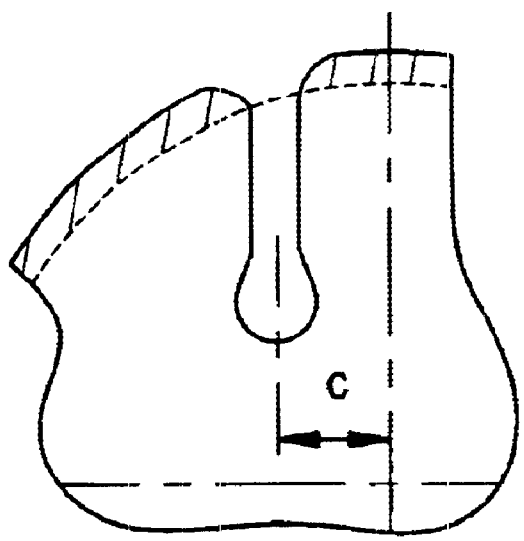
FIG. 21 illustrates a positional accuracy of the bottom of the vane-accommodating groove.

Regarding positional accuracy of the bottom of the vane-accommodating groove indicated by reference letter C of FIG. 21, in the forged product of the present invention shown in FIG. 8, variation of C; i.e., the difference between the maximum value of C and the minimum value of C, was 0.12 mm. In contrast, in the forged product produced through the conventional method, the difference between the maximum value of C and the minimum value of C was 0.2 mm. That is, the effects of the present invention were confirmed. Thirty rotors were produced in Example 1, and, for comparison, thirty rotors were produced through the conventional method.

A rotor having a chamfer R (curvature radius: 0.05 mm) was produced through the method the present invention under application of a forging load of 85 t.

Example 2

Figure 3A:
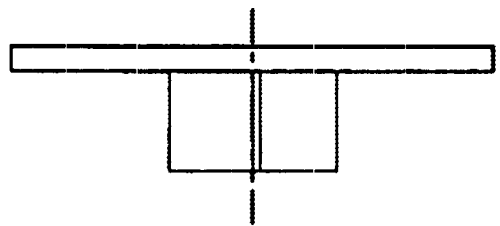
FIG. 3(A) is a side view showing an embodiment of the spacer of the present invention.
Figure 3B:
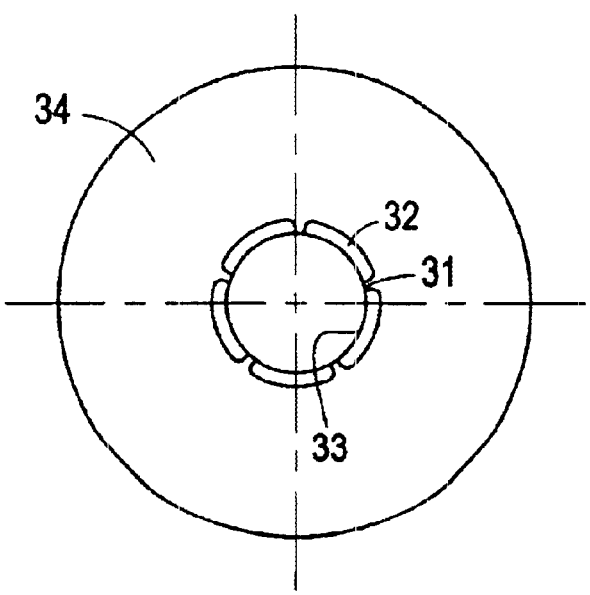
FIG. 3(B) is a plan view showing an embodiment of the spacer of the present invention
Figure 10:
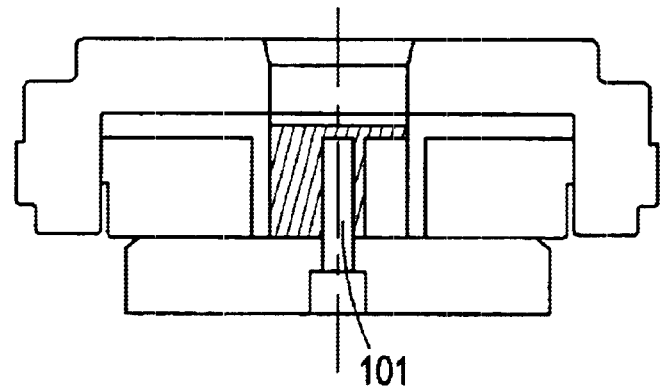
FIG. 10 shows another embodiment of the lower die of the present invention.

A rotor shown in FIGS. 13(A) and (B) and 14 was produced by use of a forging die (a lower die) shown in FIG. 10 including a spacer shown in FIGS. 3(A) and (B), and a forging die (an upper die) shown in FIG. 11. The forging apparatus and forging conditions were the same as those in Example 1.

The forging die (lower die) shown in FIG. 10 includes, on the center of the bottom surface of the lower die, a cylindrical protrusion having a maximum radius of 12 mm. In the forging die, the distance between the center of the mold cavity and vane-accommodating-groove-forming portions is 20 mm. Through use of the lower die of this configuration, a "center hole" corresponding to the cylindrical protrusion was formed.

The forging die (upper die) shown in FIG. 11 includes a depression provided at a position which corresponds to, as viewed from above the upper die, each of the vane-accommodating-groove-forming portions of the lower die, the depression being dented in a direction opposite the operation direction of the upper die. Through use of the upper die of this configuration, a "dowel" corresponding to the depression was formed.

For comparison, a rotor having a "dowel" and a "center hole" was produced through forging by means of a method employing a conventional die shown in FIG. 17. Comparison between the rotor of Example 2 and the rotor produced through the conventional method reveals that, regarding the cross-section of the peripheral excess material, as in the case of Example 1, the radius of the rotor produced through the method of the present invention is smaller than that of the rotor produced through the conventional method, and that the amount of excess material of the rotor of the present invention is reduced. Regarding positional accuracy of the cylindrical bottom of the vane-accommodating groove and positional accuracy of the center hole, in the forged product of the present invention, the difference between the maximum value of C and the minimum value of C was 0.12 mm. In contrast, in the forged product produced through the conventional method, the difference between the maximum value of C and the minimum value of C was 0.2 mm. That is, the effects of the present invention were confirmed. Thirty rotors were produced in Example 2, and, for comparison, thirty rotors were produced through the conventional method.

The present invention provides a forging die for forging a cylindrical rotor having a plurality of vane-accommodating grooves which extend toward the axis of the rotor, which forging die includes an upper die; a lower die having a mold cavity in its center portion, and a plurality of vane-accommodating-groove-forming portions which protrude inward from the inner wall which defines the mold cavity; and a spacer having a plurality of shell segments for determining a shape of a side wall of the cylindrical rotor which is segmented by the vane-accommodating grooves, and a flange for joining the shell segments, the spacer being provided in the interior of the mold cavity of the lower die. When the forging die is employed, a working step for removing a chamfer of a vane-accommodating groove of a rotor is not required, and the amount of excess material can be reduced, or provision of excess material can be prevented.

When the lower die is secured by the spacer, dimensional accuracy of vane-accommodating grooves can be enhanced during forging.

Therefore, when the forging die of the present invention is employed, a rotor of high dimensional accuracy can be produced at low cost.

While the invention has been described in detail and with reference to specific embodiments thereof, it will be apparent to one skilled in the art that various changes and modifications can be made therein without departing from the spirit and scope thereof.

What is claimed is:

1. A forging die for forging a cylindrical rotor having a plurality of vane-accommodating grooves which extend toward an axis of the rotor, comprising an upper die; a lower die having a mold cavity in a center portion, and a plurality of vane-accommodating-groove-forming portions which protrude inward from an inner wall which defines the mold cavity; and a spacer having a plurality of shell segments for defining a shape of a side wall of the cylindrical rotor which is segmented by the vane-accommodating grooves, and a flange for joining the shell segments, wherein the spacer is provided in the interior of the mold cavity of the lower die.

2. A forging die according to claim 1, wherein each of the shell segments of the spacer has an axial length equal to or greater than the axial length of the rotor and twice or less than twice the axial length of the rotor.

3. A forging die according to claim 1, wherein each of the shell segments of the spacer has a thickness $1/10$ to $1/2$ the length of each of the vane-accommodating-groove-forming portions, and wherein the thickness is measured from the inner wall which defines the mold cavity toward the center of the spacer.

4. A forging die according to claim 1, wherein a chamfer is provided between a base of each of the vane-accommodating-groove-forming portions and the inner wall which defines the mold cavity, and each of the shell segments of the spacer has a thickness 1 to 20 times the maximum curvature radius of the chamfer, and wherein the thickness is measured from the inner wall which defines the mold cavity toward the center of the spacer.

5. A forging die according to claim 1, wherein a cylindrical protrusion having a maximum radius less than the distance between the center of the mold cavity and each of the vane-accommodating-groove-forming portions is provided on the center of the bottom surface of the lower die.

6. A forging die according to claim 1, wherein a cylindrical protrusion having a maximum radius less than the distance between the center of the mold cavity of the lower die and each of the vane-accommodating-groove-forming portions is provided on a position of a surface of the upper die which faces the mold cavity, and wherein the position corresponds to the center of the bottom surface of the lower die.

7. A forging die according to claim 1, wherein the upper die has a depression on a surface facing the mold cavity at a position which corresponds to each of the vane-accommodating-groove-forming portions, and wherein the depression is dented in a direction opposite the operation direction of the upper die.

8. A closed forging production system comprising an apparatus for cutting a material and a forging machine, wherein the forging machine includes a forging die as recited in claim 1.

9. A method for producing an aluminum-alloy-made rotor, comprising forging a forging material into a rotor with a forging die as recited in claim 1, wherein the forging material is an aluminum alloy cast bar, a material obtained through extrusion of an aluminum alloy cast bar, or a material obtained through extrusion of aluminum alloy powder.

* * * * *